J. F. O'CONNOR.
FRICTION DRAFT RIGGING FOR RAILWAY CARS.
APPLICATION FILED MAR. 17, 1913.
1,065,073. Patented June 17, 1913.
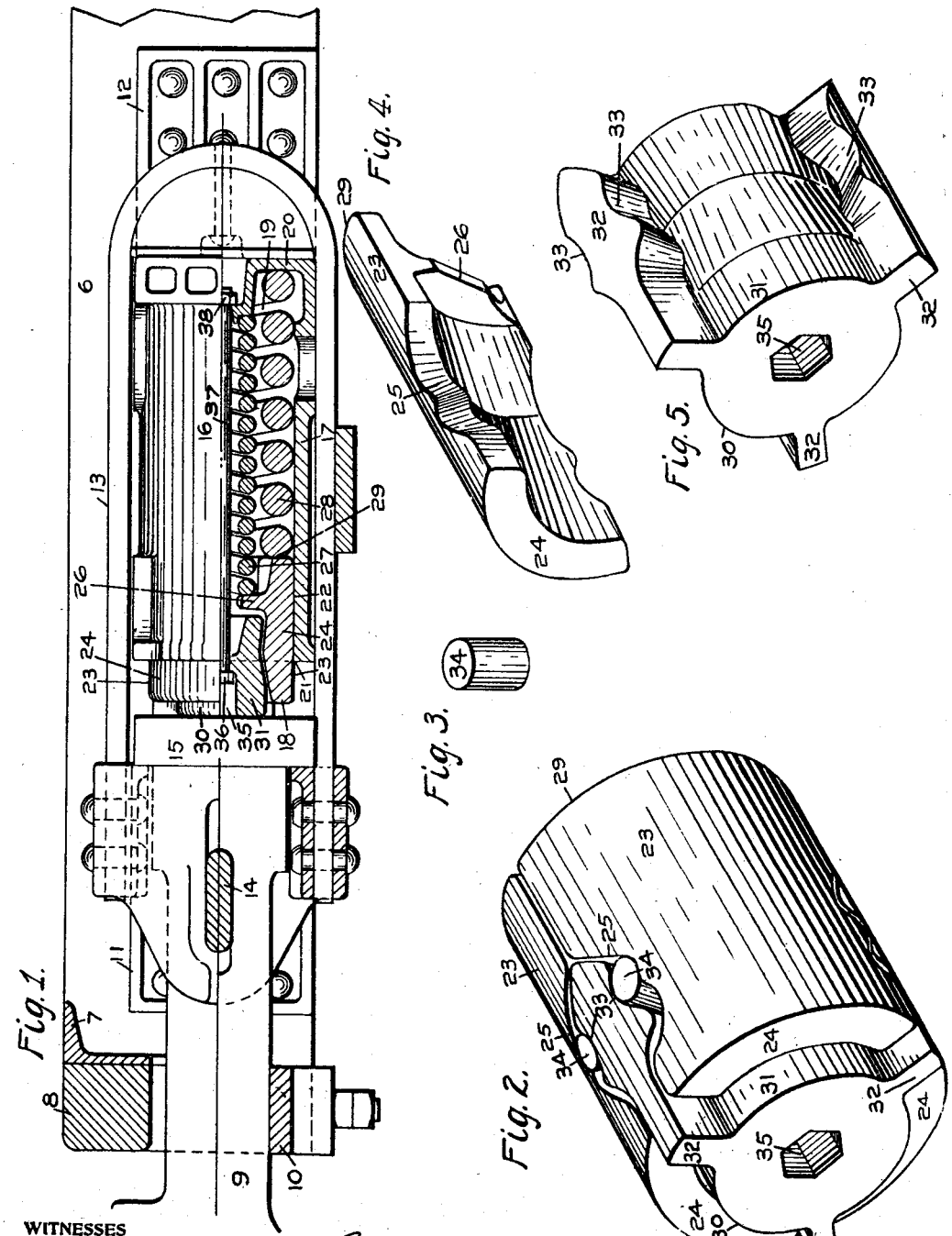
WITNESSES
Goodrich G. Lewis.
Eleanor L. Nash.
INVENTOR
John F. O'Connor.
BY George I. Haight
his ATTORNEY

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING FOR RAILWAY-CARS.

1,065,073.　　　　Specification of Letters Patent.　　Patented June 17, 1913.

Application filed March 17, 1913. Serial No. 754,748.

*To all whom it may concern:*

Be it known that I, JOHN F. O'CONNOR, a citizen of the United States, residing at Chicago, in the county of Cook and State of Illinois, have invented a certain new and useful Improvement in Friction Draft-Rigging for Railway-Cars, of which the following is a full, clear, concise, and exact description, reference being had to the accompanying drawings, forming a part of this specification.

My invention relates to improvements in friction draft rigging for railway cars.

The object of my invention is to provide a friction draft rigging of simple construction and efficient operation.

In the drawings forming a part of this specification Figure 1 is a plan view partly in longitudinal section of a draft rigging embodying my invention. Fig. 2 is a perspective view of the friction devices in assembled relation. Fig. 3 is a perspective view of one of the antifriction rolls. Fig. 4 is a perspective view of one of the friction shoes. Fig. 5 is a perspective view of the wedge.

Referring to the drawings 6 represents draft sills or parts of the car frame to which the draft rigging is applied, 7 the end sill, 8 the buffer block, 9 the draw bar, 10 the draw bar carry iron, 11 front stop members, 12 rear stop members, 13 the draft yoke secured to the draw bar by the coupler key 14, 15 the front follower, 16 the draft gear or compression resisting member comprising the shell 17 and the friction devices 18 and springs 19 within the shell. The shell is a hollow member, preferably cylindrical in shape or circular in cross section, and closed at its rear end by the preferably integral plate 20, and open at its forward end 21. The shell has an interior friction face 22 with which the outer friction faces 23 of the friction shoes 24 engage. The friction shoes 24 are preferably three in number, each shoe being provided at either edge with an antifriction roll seat 25, and on its inner face near its rear end with a shoulder 26, the shoulders 26 of the shoes when the same are in assembled position forming a spring seat for the front end of the inner spring 27 to bear against, the front end of the outer spring 28 being seated against the rear end 29 of the friction shoes, and both of said springs being seated at their rear ends against the friction shell. The wedge 30 is adapted to spread the friction shoes, and comprises a central, preferably substantially cylindrical, member 31 provided with a plurality of radial extensions or lugs 32, there being one lug for each friction shoe. Each of said lugs is provided on either side with an antifriction roll seat 33, which in the assembled position of the wedge and friction shoes is opposite an antifriction roll seat of the adjacent shoe. When the friction shoes are in assembled position, as illustrated in Fig. 2 of the drawings, there is a sufficient space between the shoes to receive the lugs 32 of the wedge 30, and between each friction shoe and the adjacent side of a lug 32 of the wedge is disposed an antifriction roll 34, there being two for each lug of the wedge.

The member 31 of the wedge is forwardly provided with a recess 35 to receive the head 36 of the connecting rod 37, which is extended through the wedge and the rear portion of the shell, being provided at its rearward end with the nut 38. On rearward movement of the wedge the lugs 32 through the antifriction rolls 34 exert a spreading force against the edges of the friction shoes, spreading them outwardly in frictional contact with the internal frictional face of the shell. The employment of two antifriction rollers for each wedging lug 32 of the wedge insures a perfect release of the parts in release movement of the gear.

The action of other parts of the draft rigging is well understood, and needs no further description.

I claim:—

1. In a draft rigging for railway cars, a draft gear comprising a shell, springs, and friction devices within the shell, the friction devices comprising a plurality of friction shoes, and a wedge to spread said shoes, the said wedge having radial lugs disposed between the edges of the friction shoes.

2. In a draft gear, a shell, springs, and friction devices within the shell, the friction devices comprising shoes, a wedge, and antifriction rolls, the wedge having a central member and radially extended lugs, the antifriction rolls being interposed between the sides of said lugs and the edges of the friction shoes.

3. In a draft gear, a shell, friction devices, and springs within the shell, the friction devices comprising a plurality of shoes, a wedge within said shoes, the wedge having radially arranged lugs extended outwardly between the shoes.

4. In a draft gear, a shell, springs, and friction devices within the shell, the friction devices comprising a plurality of friction shoes, a wedge within said shoes, and antifriction rolls, the wedge being provided with radial lugs extended between said shoes, the sides of said lugs being each provided with an antifriction roll seat, and the sides of said shoes being each provided with an antifriction roll seat, and an antifriction roll interposed between each roll seat of the wedge and the roll seat of the adjacent shoe.

5. In a draft gear, a shell, springs, a wedge, and friction shoes within the shell, the said wedge having means extended between the edges of the shoes, and adapted to exert spreading pressure against the sides of said shoes.

6. In a friction draft gear, a shell, friction shoes, a wedge, and antifriction rolls within the shell, the wedge being provided with members outwardly extended between the sides of the friction shoes, and antifriction rolls between the sides of the outwardly extended members and the sides of the friction shoes.

JOHN F. O'CONNOR.

Witnesses:
 ELEANOR L. NASH,
 JOHN A. MARTINKUS.

Copies of this patent may be obtained for five cents each, by addressing the "Commissioner of Patents, Washington, D. C."